United States Patent [19]

Itsuji et al.

[11] Patent Number: 5,440,924
[45] Date of Patent: Aug. 15, 1995

[54] HEATING RESISTOR TYPE AIR FLOW METER WITH SEPARATE/PROCESSING UNIT

[75] Inventors: Takayuki Itsuji, Katsuta; Kaoru Uchiyama, Oomiya; Mitsukuni Tsutsui, Naka, all of Japan

[73] Assignees: Hitachi, Ltd.; Hitachi Automotive Engineering Co., Ltd., both of Japan

[21] Appl. No.: 174,016

[22] Filed: Dec. 28, 1993

[30] Foreign Application Priority Data

Jan. 12, 1993 [JP] Japan .................. 5-003107

[51] Int. Cl.6 .................................... G01F 1/68
[52] U.S. Cl. ................................... 73/204.25
[58] Field of Search ........... 73/204.22, 204.23, 204.25, 73/118.2, 204.11, 204.15, 204.16

[56] References Cited

U.S. PATENT DOCUMENTS

| | | | |
|---|---|---|---|
| 4,059,982 | 11/1977 | Bowman | 73/204.17 |
| 4,227,411 | 10/1980 | Abramovich | 73/29.01 |
| 4,264,961 | 4/1981 | Nishimura et al. | 73/204.25 |
| 4,304,128 | 12/1981 | Hafner et al. | 73/204.22 |
| 4,373,386 | 2/1983 | Schuddemat et al. | 73/204.24 |
| 4,776,214 | 10/1988 | Moran et al. | 73/204.11 |
| 4,911,009 | 3/1990 | Maeda et al. | 73/204.25 |
| 5,107,812 | 4/1992 | Takamoto et al. | 73/118.2 |
| 5,176,450 | 1/1993 | Loftus | 73/768 |

FOREIGN PATENT DOCUMENTS

2276914  2/1990  Japan .
2262811A 6/1993  United Kingdom .

*Primary Examiner*—Richard E. Chilcot, Jr.
*Assistant Examiner*—Harshad Patel
*Attorney, Agent, or Firm*—Evenson, McKeown, Edwards & Lenahan

[57] ABSTRACT

A flow rate of air flowing through an air inlet pipe is detected by a heating resistor disposed therein and converted into an electric signal. A digital processing unit carries out calculation to judge whether or not the converted signal coincides with a predetermined temperature value and to correct the converted signal so that the same is caused to coincide with the predetermined value if both the values do not coincide with each other. The corrected signal is used to keep the heating resistor at the predetermined temperature. The digital processing unit is integrated with the air inlet pipe independently of a digital processing unit for engine control.

14 Claims, 8 Drawing Sheets

| NO. | DETECTED TEMPERATURE SIGNAL (Vo) | AIR FLOW RATE (Q) (g/s) | ENGINE CONTROL CODE (Cd) |
|---|---|---|---|
| 0 | 0.700 | 0.000 | 0000 |
| 1 | 0.720 | 3.125 | 03FF |
| 2 | 0.740 | 6.250 | 07FE |
| ⋮ | ⋮ | ⋮ | ⋮ |
| 30 | 1.300 | 93.750 | 7BE1 |
| 31 | 1.320 | 96.875 | 7FE0 |
| 32 | 1.340 | 100.000 | 83DF |
| ⋮ | ⋮ | ⋮ | ⋮ |
| 61 | 1.920 | 193.75 | F801 |
| 62 | 1.940 | 196.875 | FC00 |
| 63 | 1.960 | 200.000 | FFFF |

HEATING RESISTOR TYPE AIR FLOW METER WITH SEPARATE/PROCESSING UNIT

BACKGROUND OF THE INVENTION

The present invention relates to an air flow meter, and more particularly to a heating resistor type air flow meter used for engine control in a vehicle.

In this kind of the inlet air flow measuring apparatus for a vehicle, so far, for example, as described in Japanese Patent Application Laid-Open No. 2-276914 (1990), a control unit to control the current flowing through a heating resistor element is mounted on the same substrate mounting a computer for internal combustion engine control to measure air flow rate.

In recent years, a highly accurate combustion control for a vehicle engine is required for natural environmental protection and the conservation of natural resources. Thereby, the amount of computing and controlling imposed on a computer for engine control is increasing.

The objects of the present invention can be attained by providing a heating resistor type air flow meter having a processing unit which outputs a signal corresponding to the air flow rate with use of a heating resistor mounted to an inlet pipe, which comprises an inlet mounted to the inlet pipe, with the substrate being cooled or controllable in temperature.

The objects of the present invention can be further attained by providing a heating resistor type air flow meter having a processing unit which outputs a signal corresponding to the air flow rate with use of a heating resistor mounted to inlet pipe and a cover to seal the processing unit wherein the cover is sealed with glass.

The objects of the present invention can also be attained by providing a heating resistor type air flow meter having a processing unit which outputs a signal corresponding to the air flow rate with use of a heating resistor mounted to an inlet pipe, wherein the processing unit covered with lead.

Since the air flow meter itself has a processing unit to control the temperature of a heating resistor based on a program the air flow rate can be computed independent from an engine control.

Further, since the processing unit for the air flow rate is mounted to a substrate capable of regulating temperature, a highly accurate air flow rate can be detectable even when the processing unit is installed at a high temperature position in an engine room.

DESCRIPTION OF THE PREFERRED EMBODIMENTS

The present invention will be described below, referring to the accompanying drawings.

Figure 1:
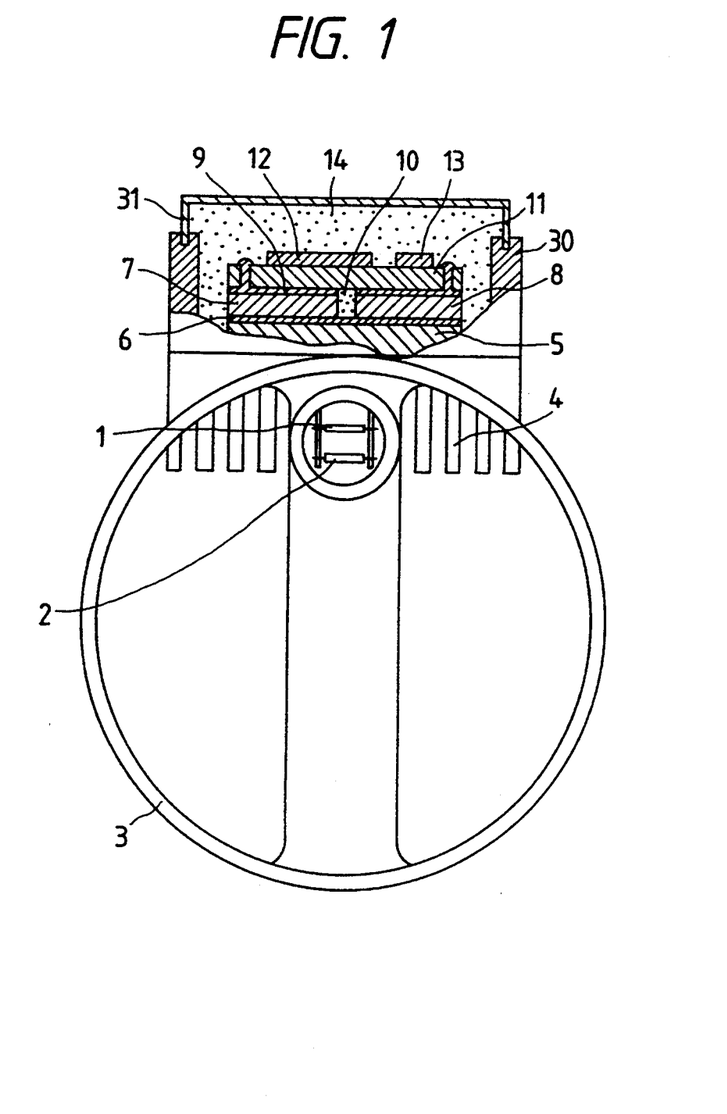
FIG. 1 is a view showing a structure of one embodiment in accordance with the present invention.

Referring now to FIG. 1, numeral 1 denotes a heating resistor disposed in an air inlet pipe 3 having heat radiation fins 4, and numeral 2 denotes a heat sensitive resistor. Placed on the flat surface of a boss of the air inlet pipe 3 are a piling structure comprising an insulating substrate 5, a layer-like metal member 6, thermoelectric elements 7 and 8 insulated from each other by an insulator 10, a layer-or plate-like metal member 9, and an insulating substrate 11 having a digital calculating or processing unit 12 and a memory 13, which are piled in the same order. The piling structure is arranged in a package or container constituted by the boss forming the bottom thereof, a side member 30 fixed thereto and a cover member 31 fixed thereto. The space between the container and the piling structure is filled or packed with glass 14. Therefore, the piling structure is so sealed so that the piled members or elements constituting the piling structure are in close contact with each other and the piling structure is brought into close contact with the boss. The thermoelectric element 7 is a semiconductor such as N-type bismuth tellurium ($Bi_2Te_3$), while the thermoelectric element 8 is a semiconductor such as P-type bismuth tellurium ($Bi_2Te_3$). The substrate 11 is heated or cooled with Peltier effect by flowing current to the thermo-electric elements 7 and 8. The temperature of the substrate 11 is changeable as described later. Numeral 15b denotes an D/A converter to convert a signal from a digital processing unit 12 to an analog signal, and numeral 15a denotes a heating power supply to supply the heating current to a heating resistor 1. The temperature of the heating resistor 1 is detected by a temperature detecting circuit which comprises a standard resistor 16a and an A/D converter 16b. The detected temperature is led to a digital processing unit 12 to calculate whether or not the heating resistor 1 is at a given temperature. When the temperature of the heating resistor 1 is above or below a predetermined value, calculations are performed in the digital processing unit 12 so that the temperature of the heating resistor 1 becomes the predetermined value. At this time or before the calculation, the air temperature is detected with an air temperature detector composed of the thermally sensitive resistor 2, a constant current supply 18a and an A/D converter 18b, and the detected temperature signal is led to the digital processing unit 12. The digital processing unit 12 corrects the calculated value on the basis of the detected temperature signal, and the corrected signal is led to a driving circuit composed of the heating power supply 15a and the D/A converter 15b so as to maintain the heating resistor 1 at the predetermined temperature.

While the heating resistor 1 is at the predetermined temperature, a value for engine control air flow rate is calculated with the digital processing unit 12 based on the signal from the temperature detecting circuit, the signal stored in the memory circuit 19 such as a ROM, the air flow rate and the engine control air flow rate. The memory circuit 19 is covered with lead not so as to be affected by electormagnetic wave.

The output signals,air temperature value described above and the calculated engine control air flow rate are input to an engine control computer. The output signals at this time are the digital signals that the engine control computer can directly receive. The engine control air flow rate value is output every preset time or at the time when a requested signal from the engine control computer is input. The electronic devices, resistors and conductive lead wires are formed on the ceramic insulating substrate 11.

Figure 3:
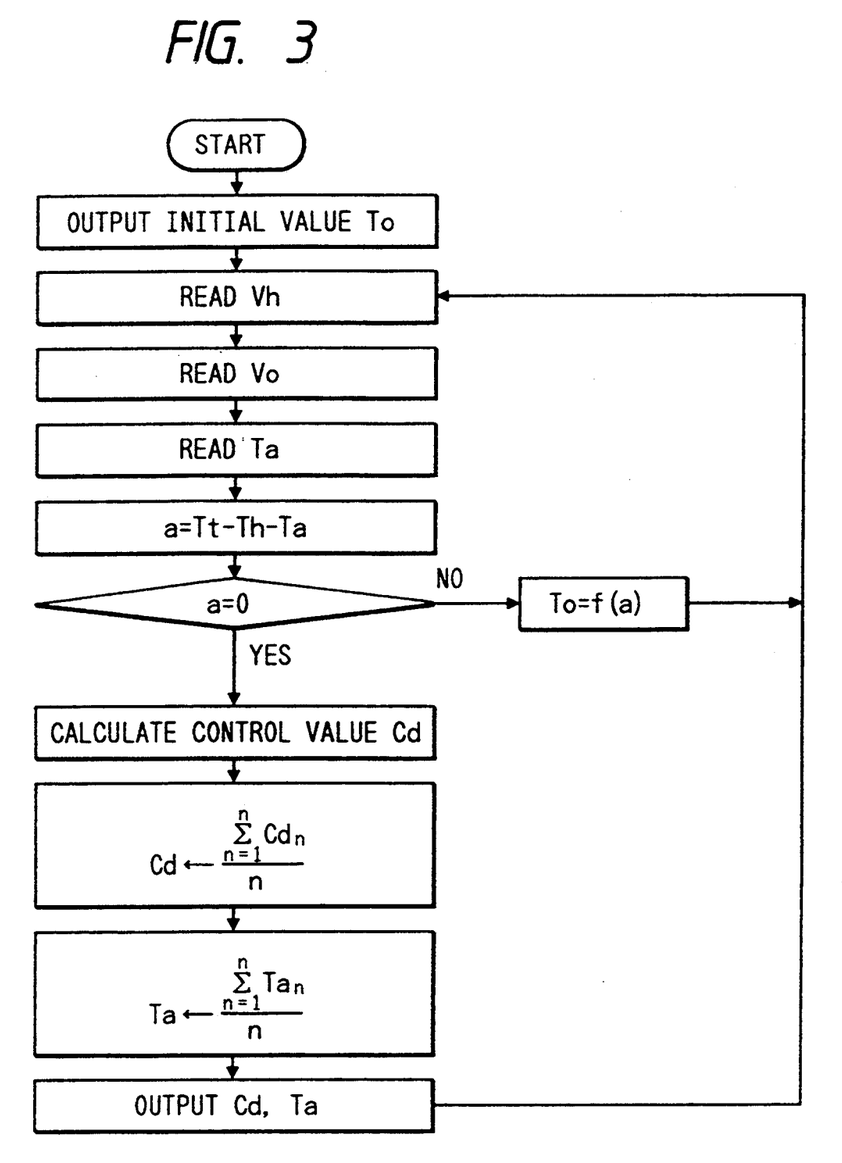
FIG. 3 is a flow chart showing an embodiment in accordance with the present invention.

Referring next to a flow chart in FIG. 3, the operation will be explained in detail. A signal corresponding to an initial temperature value To of the heating resistor 1 stored in the ROM 19 is led to the D/A converter 15$b$ through the digital processing unit 12. Based on this signal, the variable current supply 15$a$ supplies current In to the heating resistor 1. At this time, the terminal voltage Vh across the heating resistor 1 and the terminal voltage Vo across the standard resistor 16$a$ are converted into digital signals by the A/D converter 16$b$. The heated temperature Rh of the heating resistor 1 is calculated by the digital processing unit 12, such as a micro-computer, based on the converted signals, the resistance value Ro of the heating resistor 1 at a standard temperature thereof stored in the ROM 19, the temperature coefficient $\alpha$ of the heating resistor 1 and the resistance value R1 of the standard resistor 16$a$. The equations used in the calculation are shown in equations (1) and (2) below.

$$Rh = Rl(Vh - Vo)/Vo \quad (1)$$

$$(Th - Ta) = (Rh/Ro - 1)/\alpha \quad (2)$$

( Th−Ta ): Difference between the heated temperature Th of the heating resistor 1 and the detected temperature Ta by the thermally sensitive resistor 2.

When the values, which are obtained by subtracting the temperatures Th and Ta from the target temperature Tt of the heating resistor 1 stored in the ROM 19, are not zero, that is, the heating resistor 1 is not kept at the target temperature, the correction value To=f(a) is calculated based on the difference a and is used for controlling the heating resistor 1 through the D/A converter 15$b$ so as to keep the heating resistor 1 at the constant target temperature.

When the heating resistor 1 is controlled so as to keep its temperature a constant by the operation described above, the current Ih flowing through the standard resistor 16$a$ is varied corresponding to the air flow rate Q as shown in equation (3). That is, the terminal voltage Vo across the standard resistor 16$a$ is varied corresponding to the air flow rate Q as shown in equation (4).

$$Ih^2 Rh = (A + B\sqrt{Q})(Th - Ta) \quad (3)$$

A, B :Constants relating to the heating resistance $$Vo = Rl \times \sqrt{Q\{(A + B\sqrt{Q})/Rh \times (Th - Ta)\}} \quad (4)$$

Figure 4:
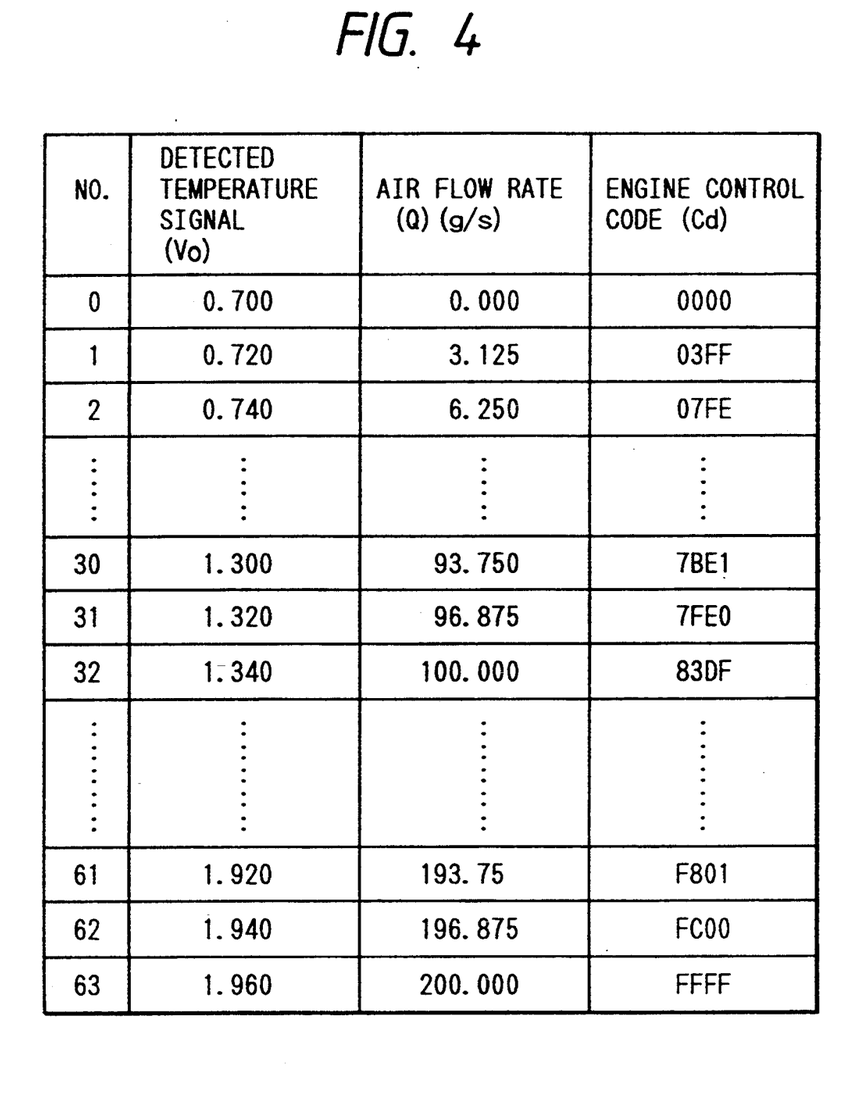
FIG. 4 is a table showing standard resistances, air flow rates and engine control air flow rate values.

When the relationship among the voltage signal Vo, the air flow rate Q and the engine control air flow rate value Cd has practically been measured, for example shown in FIG. 4, and stored in a RAM 20, the digital processing unit 12 calculates the engine control airflow rate Cd by using this relation. Both of the inlet air temperature output signal Ta described above and the engine control air flow rate output signal Cd are measured and led to the engine control unit through an input/output buffer 17 at a certain time interval or at the request of the engine control unit.

Incidentally, the engine control value and the inlet air temperature signal are based on the averaged value of the inlet air flow rates obtained through measuring once or more than twice. In addition, the digital processing unit 12 converts the signal (Vh−Vo) related with the inlet air temperature output signal Ta into engine control code signals suitable for the engine control unit and outputs these code signals through the input/output buffer 17.

Figure 5:
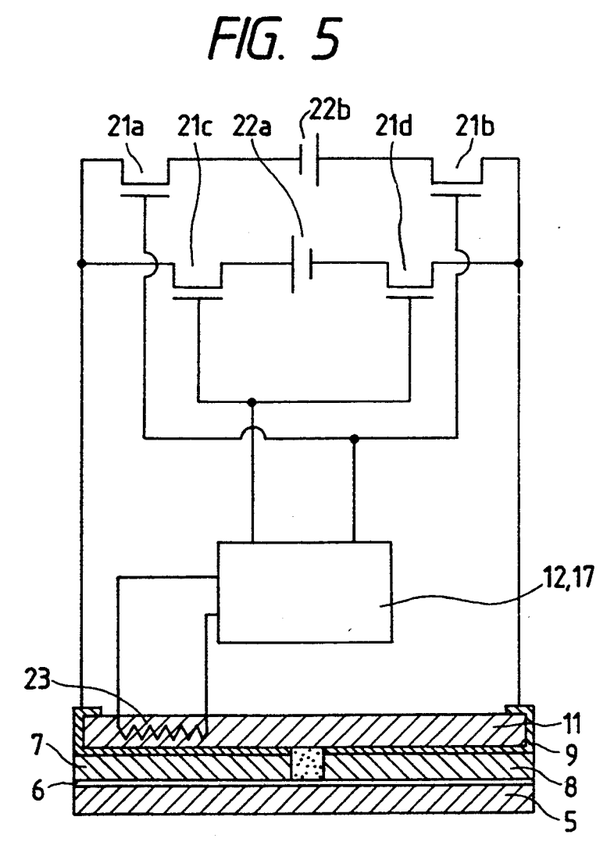
FIG. 5 shows an embodiment of a temperature control apparatus in accordance with the present invention.

Referring next to FIG. 5 a structure of temperature control, for the substrate will be explained. The substrate 11 is heated or cooled with Peltier effect by flowing current to a thermo-electric elements 7 and 8 which are connected together with the metal member 6. The temperature of the substrate is detected by a temperature sensor 23 buried in or contacted to the substrate 11 so as to introduce the detected temperature signal into the digital processing unit 12. A calculation is carried out by the digital processing unit 12 based on the detected signal, and when the calculated temperature is higher than the temperature stored in the memory 19, switches 21$c$ and 21$d$ connected with power supply 22$a$ are switched on to cool the substrate 11 with Peltier effect. Since the insulating substrate 5 is on the side of heat generation, the generated heat is removed through heat radiation fins 4. On the other hand, when the temperature is lower, the switches 21$a$ and 21$b$ connected with power supply 22$b$ are switched on by the digital processing unit 12 to heat the substrate 11 with Peltier effect by reverse current flow. By these operations, the temperature of the substrate 11 is kept at a constant.

Alternative embodiments of FIG. 5 are shown in FIG. 6 through FIG. 10. Since the structures of the substrates are the same as in FIG. 5, the explanation thereof will be omitted here.

Figure 6:
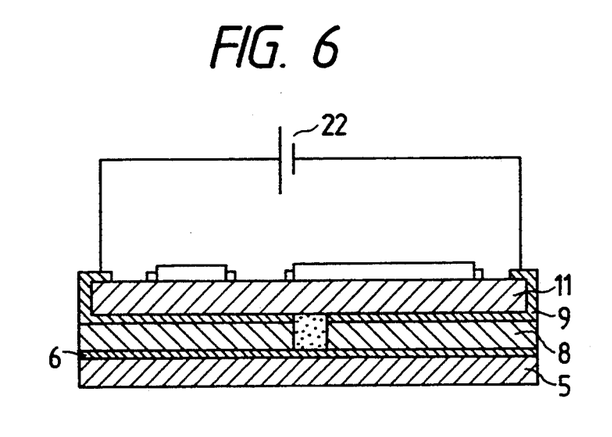
FIG. 6 shows an embodiment of a cooling System in accordance with the present invention.

FIG. 6 shows an embodiment only having a cooling function in which the substrate 11 is cooled with a power supply 22.

Figure 7:
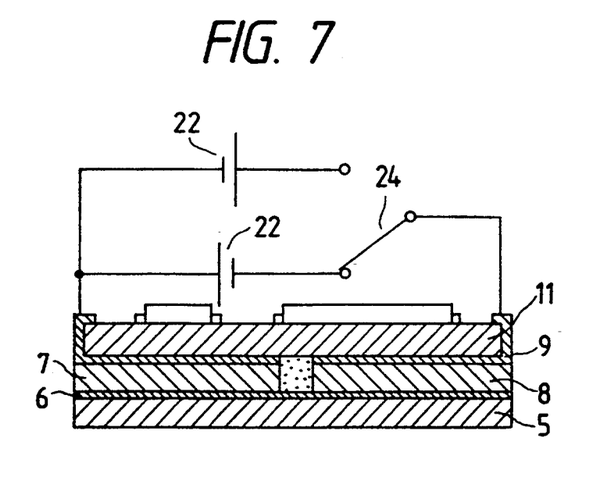
FIG. 7 shows an embodiment of another temperature control apparatus in accordance with the present invention.

FIG. 7 shows an embodiment having temperature control by of switching two power supplies 22 with a switch 24.

Figure 8:
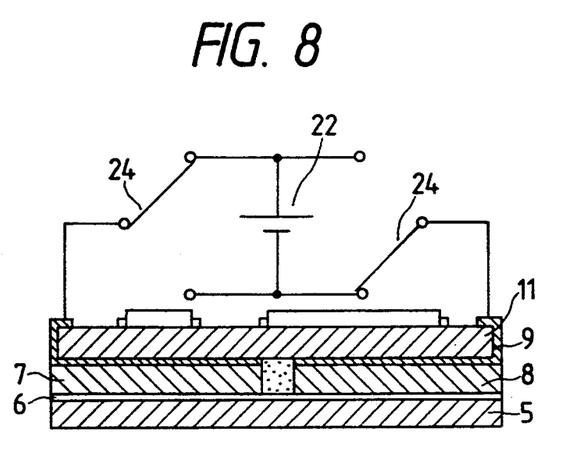
FIG. 8 shows an embodiment of another temperature control apparatus in accordance with the present invention.

FIG. 8 shows an embodiment only having a cooling function using an analog control which is obtainable with comparatively low cost.

Figure 9:
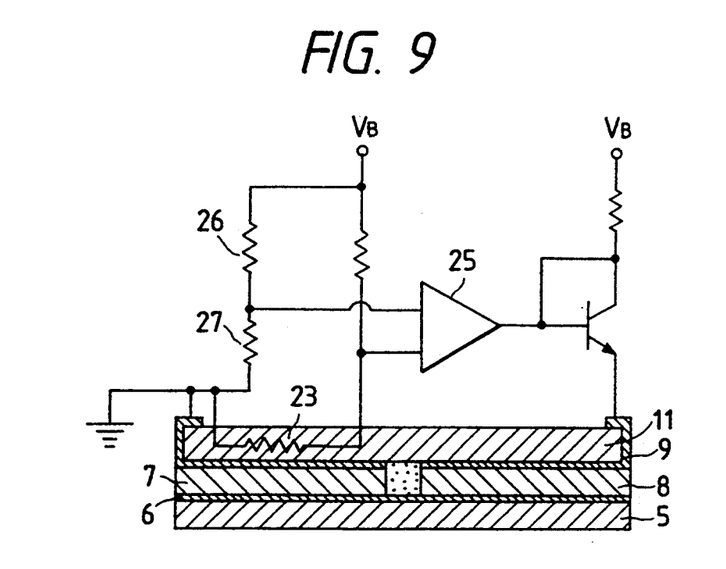
FIG. 9 shows an embodiment of another temperature control apparatus in accordance with the present invention.

FIG. 9 shows an embodiment in which the substrate 11 is only cooled analogously. A comparator 25, which may have a collector at an output terminal thereof, is turned off when the voltage across the temperature sensor 23 for detecting the temperature of the substrate 11 is higher than a standard or reference voltage set by standard resistors 26 and 27 that is, the temperature of the substrate 11 is higher than a predetermined temperature, whereby a current flows through thermoelectric elements 7 and 8 so as to cool the substrate 11. On the other hand, when the temperature of the substrate 11 is lower than the predetermined temperature, the comparator 25 is turned on whereby the current is prevented from flowing through the thermoelectric elements 7 and 8 so as to stop cooling the substrate 11. The temperature of the substrate 11 tends always to rise when it is not cooled because heat generating sources such as the heating power supply 15a are formed on the substrate 11. If, therefore, a cooling function is provided, the substrate 11 can be kept at a desired constant temperature.

Figure 10:
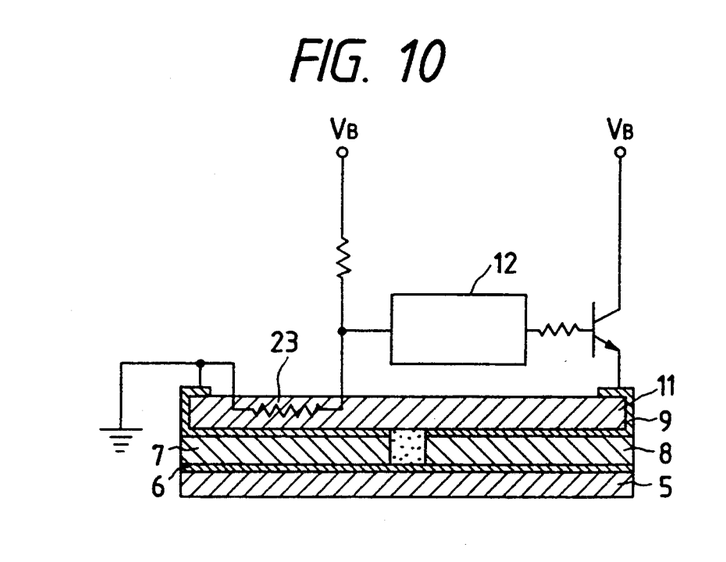
FIG. 10 shows an embodiment of another temperature control apparatus in accordance with the present invention.

FIG. 10 shows an embodiment only having a cooling function using the digital calculating circuit 12. The digital processing unit 12 compares the voltage across the temperature sensor 23 with that corresponding to the set temperature stored in the memory to obtain a temperature correcting value and controls the temperature of the substrate 11 on the basis of the obtained temperature correcting value to maintain the substrate 11 at the desired constant temperature as in FIG. 9.

The embodiments shown in FIG. 6 through FIG. 10 are capable of providing substantially the same effect as in the embodiment in FIG. 5 when they are chosen according to the purpose of use.

Figure 2:
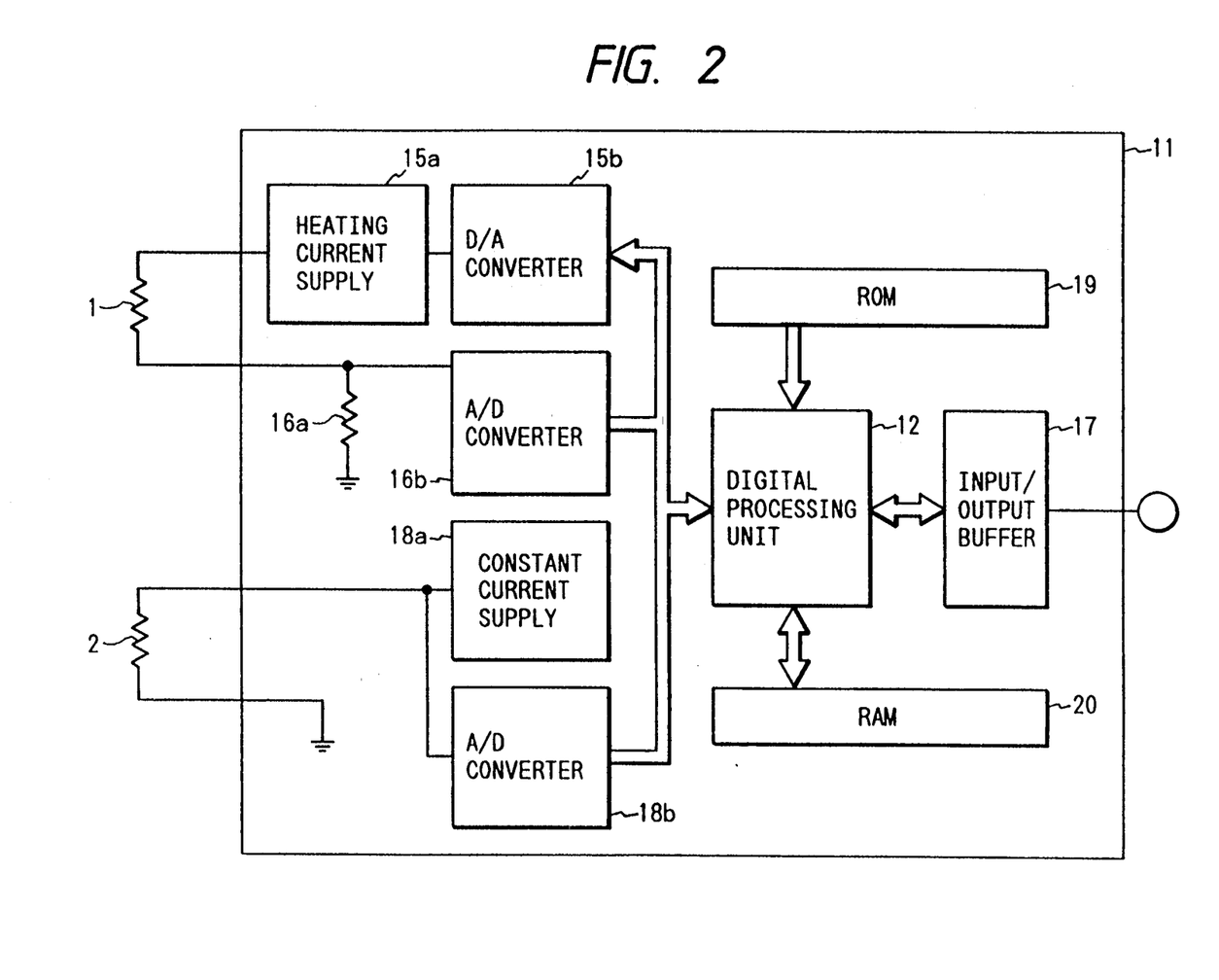
FIG. 2 is a graph showing a structure of an embodiment in accordance with the present invention.
Figure 11:
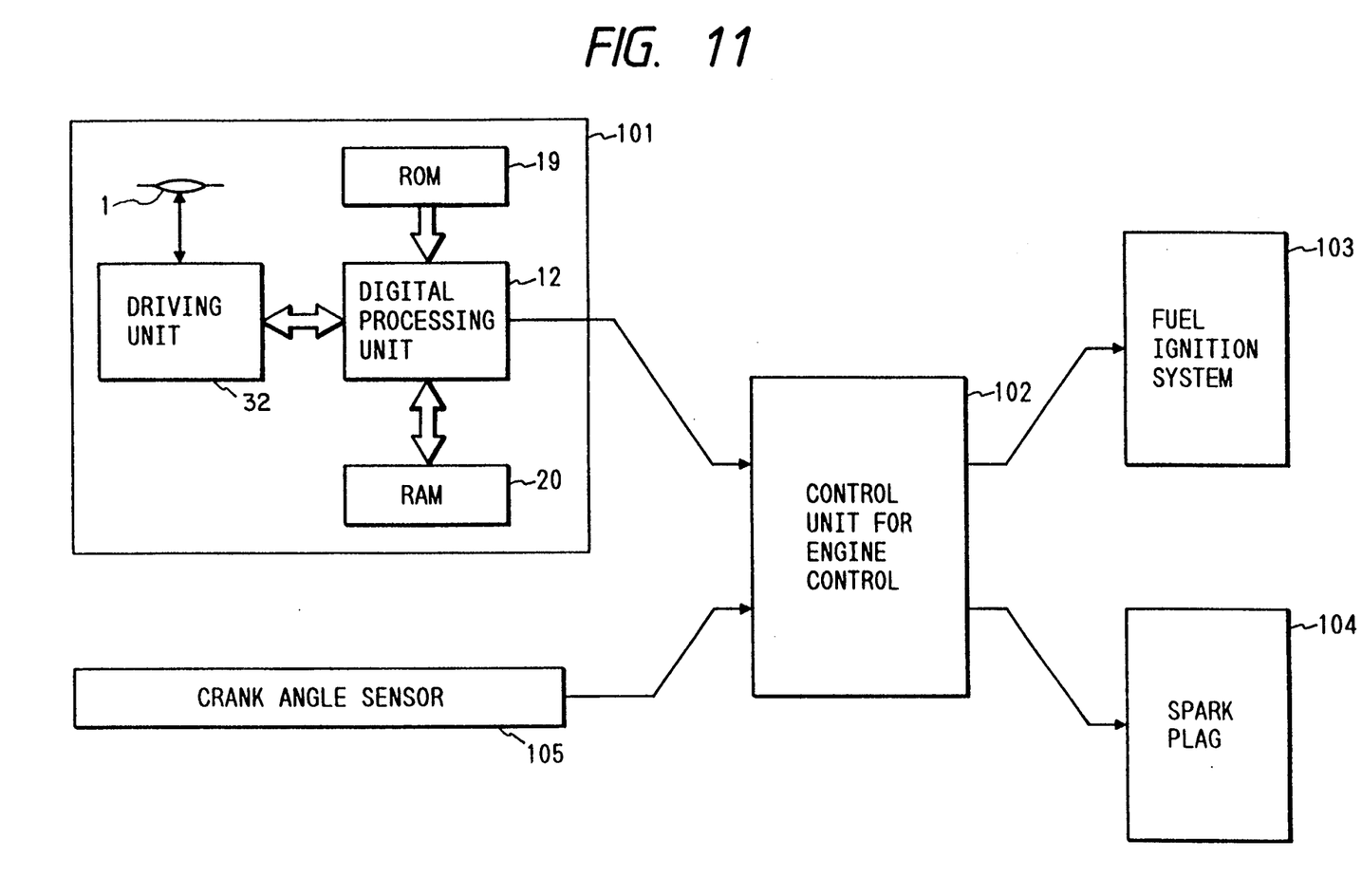
FIG. 11 is a graph showing an embodiment of an engine control system in accordance with the present invention.

Next, FIG. 11 shows an embodiment of an engine control system in accordance with the present invention. In this system, the air flow rate detected with an air flow meter 101 and the rotational angle detected with a crank angle sensor 105 are input into an engine control unit 102 to calculate the fuel injection rate and the ignition timing and to output them to a fuel injection system 103 and an ignition system 104. Therein, the air flow meter comprises, as explained in FIG. 1 and FIG. 2, the heating resistor 1, a driving unit 32, the digital processing unit 12, the ROM 19 and the RAM 20. Since the digital processing unit 12 for air flow rate detection is provided separately from the control unit for engine control 102, the burden of the digital processing unit in the engine control unit 102 can be decreased and it can be realized for the air flow meter 101 to produce and output a desired air flow rate.

According to the present invention, a flow meter is provided which has high accuracy is capable of decreasing the burden of an engine control unit and it has thermal resistivity.

What is claimed is:

1. A heating resistor type air flow meter which measures an air flow rate with use of a heating resistor provided in an inlet pipe, comprising a processing unit configured with a program to control temperature of said heating resistor and mounted to said inlet pipe wherein said processing unit comprises a memory storing data representing a relationship between a signal corresponding to an electrical current flowing through said heating resistor and the air flow rate corresponding thereto, and an additional processing unit operatively associated with an engine for direct control, thereof.

2. A heating resistor type air flow meter according to claim 1, wherein the first-mentioned processing unit generates a code signal the same as an engine control code signal used to control the engine.

3. A heating resistor type air flow meter having a processing unit which outputs a signal corresponding to an air flow rate with use of a heating resistor provided in an inlet pipe, a substrate mounted to said inlet pipe, and means for maintaining said substrate at a substantially constant temperature, wherein said processing unit is mounted to said substrate.

4. A heating resistor type air flow meter according to claim 3, wherein said constant temperature maintaining means is of a Peltier effect type.

5. A heating resistor type air flow meter according to claim 4, wherein said processing unit is configured with a program to control temperature of said heating resistor.

6. A heating resistor type air flow meter according to claim 3, wherein said processing unit is configured with a program to control temperature of said heating resistor.

7. A heating resistor type air flow meter having a processing unit which outputs a signal corresponding to an air flow rate with use of a heating resistor provided in an inlet pipe, a temperature controllable substrate mounted to said inlet pipe, and means for maintaining said substrate at a substantially constant temperature, wherein said processing unit is mounted to said substrate.

8. A heating resister type air flow meter according to claim 7, further comprising a temperature sensor to regulate the temperature of said substrate.

9. A heating resistor type air flow meter according to claim 8, wherein said processing unit is configured with a program to control temperature of said heating resistor.

10. A heating resistor type air flow meter according to claim 7, wherein said processing unit is configured with a program to control temperature of said heating resistor.

11. A heating resistor type air flow meter for an engine having a processing unit which outputs a signal corresponding to an air flow rate with use of a heating resistor provided in an inlet pipe, and a substrate mounted to said inlet pipe wherein said processing unit which is mounted to said substrate is sealed with glass, and an additional processing unit is operatively associated with the engine for directly controlling the engine.

12. A heating resistor type air flow meter according to claim 11, wherein said processing unit is configured with a program to control temperature of said heating resistor.

13. A heating resistor type air flow meter for an engine having a processing unit which outputs a signal corresponding to an air flow rate, an additional processing unit for directly controlling the engine, a heating resistor operatively associated with said processing unit and provided in an inlet pipe, and a substrate mounted to said inlet pipe, wherein said processing unit, which outputs the signal corresponding to the air flow rate, is mounted to said substrate and is covered with lead.

14. A heating resistor type air flow meter according to claim 13, wherein said processing unit is configured with a program to control temperature of said heating resistor.

* * * * *